(No Model.)

W. HAILES.
CAR WHEEL.

No. 477,539.   Patented June 21, 1892.

Witnesses:
Frederick A. Hailes
A. Selkirk Jr.

Inventor.
William Hailes

UNITED STATES PATENT OFFICE.

WILLIAM HAILES, OF ALBANY, NEW YORK.

CAR-WHEEL.

SPECIFICATION forming part of Letters Patent No. 477,539, dated June 21, 1892.

Application filed June 8, 1891. Serial No. 395,491. (No model.)

*To all whom it may concern:*

Be it known that I, WILLIAM HAILES, a citizen of the United States, residing at Albany, in the county of Albany and State of New York, have invented certain new and useful Improvements in Cast-Iron Car-Wheels, of which the following is a specification:

My invention relates to improvements in single-plate cast-iron car-wheels; and it consists in car-wheels embodying the elements hereinafter particularly described, and specifically set forth in the claims.

The object of my invention is to produce a cast-iron single-plate wheel in which the hub and rim will be integral with a web which will embody in it, at its portion neighboring the hub, a series of radial corrugations which are extended outwardly from the hub and intersect and blend with an annular corrugation neighboring the rim at points in the said corrugation several inches distant from the rim, whereby the said web when the wheel is being cast will not become strained to a high tension when the several portions of the wheel are cooling, and all liability of fractions occurring in the wheel because of a strain of high tension on the metal produced by variations of the times of shrinkages of the several portions of the wheel and unequal degrees of contraction of parts, as is liable in cast-iron wheels, is obviated, so that a stronger union of the rim with the hub for resisting both vertical and lateral strains in every day work, may be effected with the employment of a less weight of metal than heretofore used in single-plate wheels of like diameter. I attain this object by the employment in the wheel of the elements illustrated in the accompanying drawings, forming a part of this specification, in which—

Figure 1:
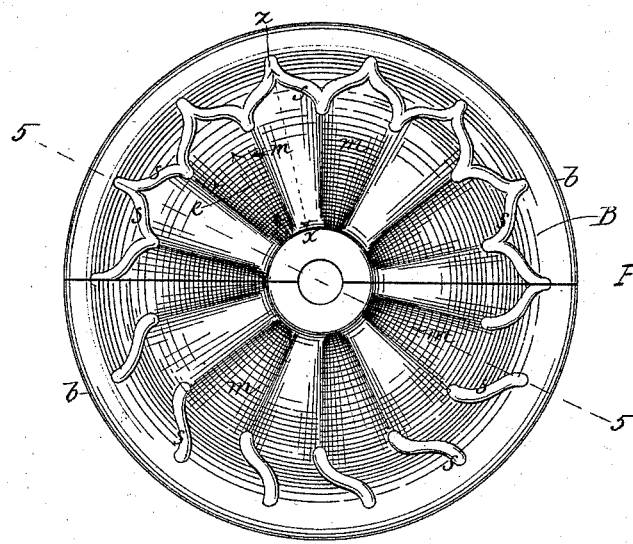
Figure 3:
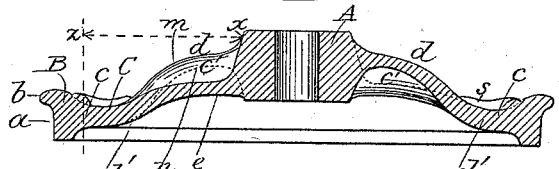
Figures 2, 4:
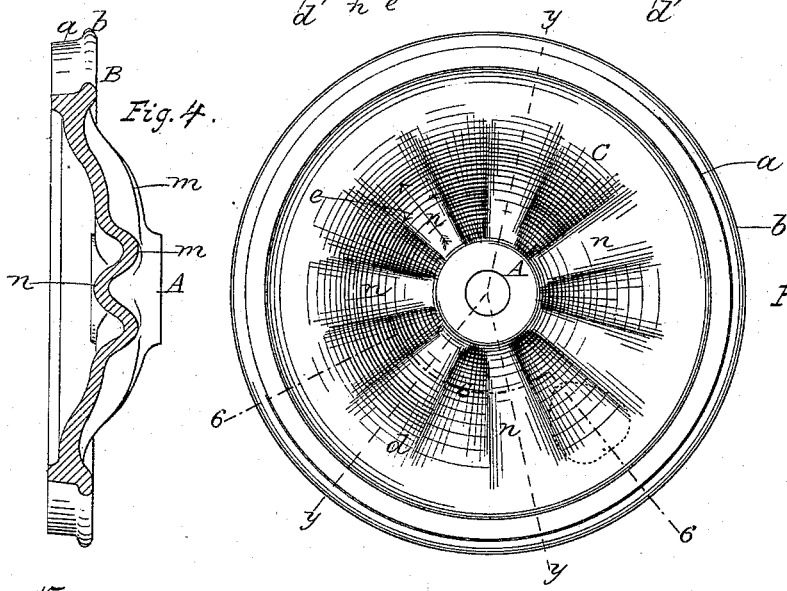

Figure 1 is a view of a car-wheel from its rear side, embodying the improvements in this invention. Fig. 2 is a view of the same from its face side. Fig. 3 is a sectional view taken at line 5 5 in Fig. 1. Fig. 4 is a sectional view taken at line 6 6 6 in Fig. 2.

The same letters of reference refer to like parts throughout the several views.

In the drawings, A is the hub of the wheel. B is the rim, of which $a$ is the usual chilled tread portion, and $b$ is the usual flange. C is the web, which holds the said rim B connected with said hub A, and is integral with both the said rim and hub. This web C joins all around with the hub and extends radially, as from $x$ at the hub, to a line corresponding with dotted line $z$, Fig. 3, where it connects with the rim. This web C embodies in its structure the series of radial corrugations $d$ and $e$, and the annular corrugations $c$. This latter corrugation $c$ neighbors the rim B and becomes integral with it at dotted line $z$, Fig. 3. The radial corrugations $d$ and $e$, alternate and start all around from the hub and extend radially from the same to a distance about at or a little past a line midway between the hub and rim and concentric with both. At this line, midway between the hub and rim, these radial corrugations $d$ and $e$ meet the annular corrugation $c$ and blend with the same, as shown, and in no case are they extended so as to meet with the rim, but are made to terminate within several inches from the line $z$, where the annular corrugation $c$ becomes integral with the rim B. The ridges $m$ of the radial corrugations $d$ start from the hub A at points near the line of the plane in the rear end of the hub and are continued on forwardly-curved lines radially from near the rear end of said hub to about midway between it and the rim, and there join and blend with the annular corrugation $c$ from its rear side, as shown in Fig. 3 by both full and dotted lines. The ridges $n$ of the radial corrugations $e$ also start from the hub, but from points near a line with the plane of the front end of the same, and are continued on a less sharp curve than ridges $m$ of corrugations $d$ forwardly and radially to about midway in the web and there join and blend with the annular corrugation $c$ from its front side, as shown by full and dotted lines in Fig. 3. These radial corrugations $d$ and $e$ alternate in the web and are integral with each other throughout their entire extensions from the hub to the annular corrugation $c$, so that the continuity of the several wrinkles of these alternating radial corrugations are unbroken, as illustrated in Fig. 4.

In some cases where it is desirable to reduce the weight of the metal in wheels of a given diameter and embodying a web composed of the said radial and annular corrugations, a series of openings $o$ (illustrated by dotted line and representing a single opening in Fig. 2) may be made in the web C at intervals—say corresponding with corrugations $d$ or $e$. When such openings are made in the web, they begin at a short distance—say two inches, more or less—from the rim B and are to occur in the annular corrugation $c$, and are extended inwardly toward the hub to a short distance, and in no case is the width of these openings made greater than the width of the radial corrugations $d$ or $e$ they may cut through.

The above-described radial corrugations in web C may be of even number, yet I prefer to make them with odd numbers, so that a line (illustrated by dotted lines $y$, Fig. 2) drawn through the center of either ridges $d$ or $e$ in direction from the rim to the hub will not coincide with another line drawn from the hub through like ridges to the rim, but will only intersect with such other lines, as lines $y$ $y$, same figure, and as do the lines forming the letter Y. In the employment of such odd numbers of the respective radial corrugations $d$ and $e$, the web C is made to be less rigid between the rim and hub than it would be were the corrugations employed in even numbers, so that each would have opposite to it a similar corrugation radiating from the hub on a corresponding or coincident line, as heretofore in wheels having their webs between the hub and rim comprising radial corrugations only. In some cases where the wheels are to be employed in extra heavy service or are to run under high speeds or on roads with sharp curves the metal of the annular corrugation $c$ may be reinforced from one of its sides, as from the rear side, by ribs $s$, arranged singly, as shown in the lower half of Fig. 1, or in pairs, as shown in the upper half of the same figure.

By the employment of the above-described web C, comprising the two kinds of corrugations between the hub and rim, the first and sudden chilling and shrinkage of the rim of the wheel, followed by the later shrinking of the several corrugations in said web with the metal of the hub last cooling and shrinking, operates to relieve the metal in the web itself and at its lines of juncture of the web with the rim and hub from the strain from tension heretofore produced by the differing times and degrees of shrinkages of the several parts of the wheel, and which in many cases result in cracks or flaws, which weaken the strength of the wheels or render them unfit for service. By forming the ridges of the radial corrugations $d$ with sharper curves than those of the alternating radial corrugations $e$, and causing both to join and blend with the outlying annular corrugation $c$, neighboring the rim at near midway between the hub and rim, there is provided, neighboring the hub, a series of wrinkles nearly corresponding at their commencement at the hub with the length of the hub and gradually lessening in depth until they are reduced to a common level or plane at the points of their union and blending with the annular corrugations of the web, thereby giving to the web as great strength for resisting both vertical and lateral strain as have the webs of the double or hollow plate wheels of the same diameter, and containing a greater weight of metal.

Having described my invention, what I claim, and desire to secure by Letters Patent, is—

1. A cast-iron car-wheel having a single-plate web C, which comprises the series of radial corrugations $d$ and $e$, radiating from the hub, and an annular corrugation $c$, neighboring the rim, the said radial corrugations joining and blending with the said annular corrugation at near midway between the hub and rim with which said single-plate web is integral, substantially as and for the purposes set forth.

2. A cast-iron car-wheel having the single-plate web C integral with both the hub and rim and comprised by two series of radial corrugations, as $d$ $d$ and $e$ $e$, neighboring the hub, and an annular corrugation $c$, neighboring the rim, the ridges of one series of said radial corrugations bending forwardly with sharper curves from the hub to the points of their junction and blending with the said annular corrugation than do the ridges of the other series of said radial corrugations, substantially as and for the purposes set forth.

3. A cast-iron car-wheel having a single-plate web C, which is integral with both the hub and rim and comprises around the hub two series of alternating radial corrugations, as $d$ and $e$, the corrugations $d$ of one series being of an odd number and integral with corrugations $e$ in like odd number in the other series, substantially as and for the purpose set forth.

In testimony that I claim the invention above set forth I affix my signature in presence of two witnesses.

WILLIAM HAILES.

Witnesses:
FREDERICK A. HAILES,
ALEX. SELKIRK, Jr.